(12) United States Patent
Brocato (10) Patent No.: US 8,687,674 B1
(45) Date of Patent: Apr. 1, 2014

(54) SAW CORRELATOR SPREAD SPECTRUM RECEIVER

(75) Inventor: Robert W. Brocato, Sandia Park, NM (US)

(73) Assignee: Sandia Corporation, Albuquerque, NM (US)

( * ) Notice: Subject to any disclaimer, the term of this patent is extended or adjusted under 35 U.S.C. 154(b) by 1961 days.

(21) Appl. No.: 11/245,358

(22) Filed: Oct. 6, 2005

Related U.S. Application Data

(60) Provisional application No. 60/713,625, filed on Sep. 1, 2005.

(51) Int. Cl.
*H04B 1/00* (2006.01)

(52) U.S. Cl.
USPC ........... 375/151; 375/136; 375/142; 375/143; 375/147; 375/150; 375/152

(58) Field of Classification Search
USPC .......................... 375/151, 149, 150, 152, 153
See application file for complete search history.

(56) References Cited

U.S. PATENT DOCUMENTS

| | | | | |
|---|---|---|---|---|
| 4,672,658 A | * | 6/1987 | Kavehrad et al. | 455/555 |
| 5,784,403 A | * | 7/1998 | Scott | 375/151 |
| 6,047,306 A | * | 4/2000 | Hikita et al. | 708/815 |
| 6,265,807 B1 | * | 7/2001 | Koga et al. | 310/313 B |
| 6,970,496 B1 | * | 11/2005 | Ben-Bassat et al. | 375/141 |
| 7,653,118 B1 | * | 1/2010 | Whelan et al. | 375/139 |
| 2004/0213358 A1 | * | 10/2004 | Patel et al. | 375/316 |
| 2007/0105515 A1 | * | 5/2007 | Muterspaugh et al. | 455/234.1 |

OTHER PUBLICATIONS

"Ultra-Wideband Communication using a SAW correlator Zero-IF architecture" by Robert Brocato, Edwin Heller, 2003 IEEE Topical Conference on Wireless communication technology.*
J. Kuhne, "A Demonstrator for a Low Cost Cordless Multi-Carrier Spread-Spectrum System", IEEE Ultrasonics Symposium, 1998 pp. 377-380.
R. Brocato, et al "High Frequency SAW Correlator Module", IEEE Electronic Components and Technology Conference, 2003, pp. 458-463.
R. Brocato et al, "UWB Communication using SAW Correlators," IEEE radio and wireless conference, Atlanta, GA, 2004, pp. 267-270.
Robert W. Brocato, "A Zero-Power Radio Receiver," SAND2004-4610, Sep. 2004.
Robert W. Brocato, "Passive Microwave Tags," SAND2004-4924, Oct. 2004.

(Continued)

*Primary Examiner* — Dhaval Patel
(74) *Attorney, Agent, or Firm* — Martin I. Finston (57) ABSTRACT

A surface acoustic wave (SAW) correlator spread-spectrum (SS) receiver is disclosed which utilizes a first demodulation stage with a chip length n and a second demodulation stage with a chip length m to decode a transmitted SS signal having a code length l=n×m which can be very long (e.g. up to 2000 chips or more). The first demodulation stage utilizes a pair of SAW correlators which demodulate the SS signal to generate an appropriate code sequence at an intermediate frequency which can then be fed into the second demodulation stage which can be formed from another SAW correlator, or by a digital correlator. A compound SAW correlator comprising two input transducers and a single output transducer is also disclosed which can be used to form the SAW correlator SS receiver, or for use in processing long code length signals.

9 Claims, 10 Drawing Sheets

(56) References Cited

OTHER PUBLICATIONS

G. F. Cardinale, et al, "Fabrication of a surface acoustic wave-based correlator using step-and-flash imprint lithography", Journal of American Vacuum Society, 2004, vol. 22, No. 6 pp. 3265-3270.

Robert W. Brocato, et al, "Microsystem Packaging of an RF SAW Correlator," Electronic Component and Technology Conference, Orlando, Fl., 2005, pp. #182.

* cited by examiner

"Prior Art"

SAW CORRELATOR SPREAD SPECTRUM RECEIVER

CROSS REFERENCE TO RELATED APPLICATIONS

This application claims priority to provisional Application No. 60/713,625 filed on Sep. 1, 2005.

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates in general to surface acoustic wave (SAW) correlators and to the use of such devices to form a spread-spectrum (SS) radio-frequency (RF) receiver. The present invention further relates to a SAW correlator which is responsive to a very long chip length $l=n \times m$ while using input and output transducers with chip lengths of n and m, respectively.

BACKGROUND OF THE INVENTION

Figure 1:
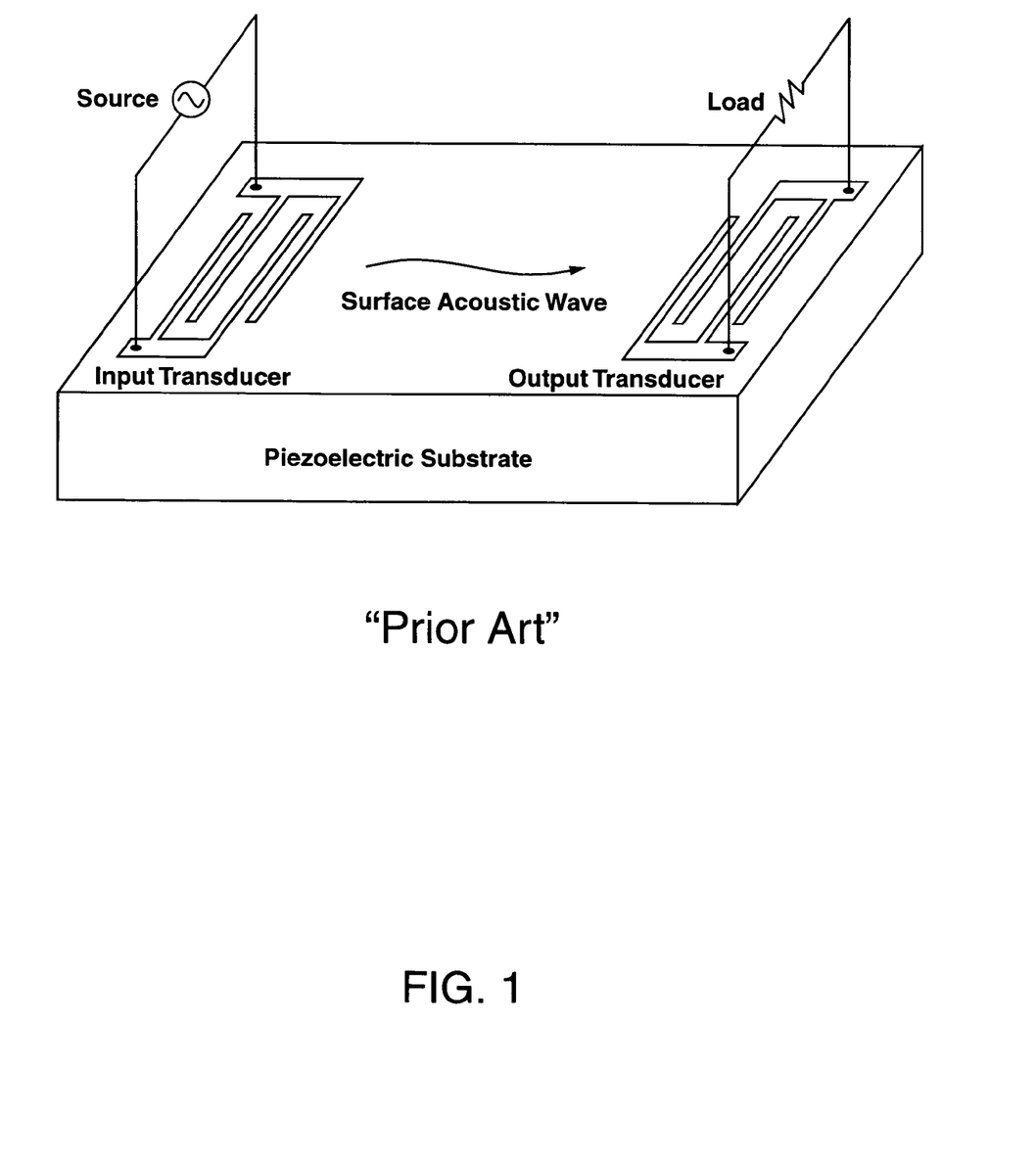
FIG. 1 shows schematic perspective view of a conventional SAW correlator having a single input transducer and a single output transducer, with the input transducer being driven by a source, and with the output transducer being connected to a load.

A conventional SAW correlator comprises a piezoelectric substrate with an input transducer and an output transducer as shown in FIG. 1. The input transducer and the output transducer each comprise interdigitated comb electrodes (also referred to simply as interdigitated electrodes, or comb electrodes) having metal fingers which can be electrically stimulated to produce a surface acoustic wave in the piezoelectric substrate in response to an RF source voltage applied to the interdigitated comb electrodes. As an example, a 3 gigaHertz (GHz) RF signal propagating in free space will have a wavelength of 10 centimeters (cm). When coupled by an antenna into the input transducer of a SAW correlator comprising a lithium niobate piezoelectric substrate, this same 3 GHz RF signal will stimulate the SAW correlator to produce a surface acoustic wave having a wavelength of $1.16 \times 10^{-4}$ cm which is about 100,000 times smaller than the RF signal in free space. The SAW correlator can take advantage of this wavelength compression to perform signal processing. With an appropriately coded RF signal applied to the input transducer, the SAW correlator can decode the RF signal and generate a signal at the output transducer containing the information transmitted in the RF signal. Operation of the input transducer and the output transducer can also be functionally reversed to produce a coded RF signal containing information fed into the SAW correlator in the reverse direction as a series of short pulses (i.e. feeding the information into the output transducer which now functions as an input transducer to generate an encoded RF signal at the input transducer which now functions as an output transducer).

A significant problem with SAW correlators is making the SAW correlators long physically and in code space. As the surface acoustic wave travels under the output transducer in FIG. 1, the acoustic energy in the wave is quickly dissipated as the wave generates an output voltage in the output transducer. As a result, it is difficult to build a SAW correlator with a chip length greater than about 100-200 chips.

The term "chip" is defined herein as a set of interdigitated fingers in an interdigitated comb electrode of an input transducer or an output transducer of the SAW correlator with a predetermined arrangement of spacings so as to be responsive to generate or detect a surface acoustic wave having a predetermined phase coding arrangement. The term "chip length" refers to the total number of chips required for generating or detecting a particular code pattern using the SAW correlator.

The present invention overcomes the limitations of the prior art by providing a SAW correlator which is responsive to process an electrical input signal having a chip length which can be in the range of 100 to 2000 or more.

The present invention also provides an apparatus for receiving a spread-spectrum (SS) signal transmitted at an RF frequency with information encoded with a very long chip length which can be in the range of 100 to 2000 or more.

These and other advantages of the present invention will become evident to those skilled in the art.

SUMMARY OF THE INVENTION

The present invention relates to an apparatus for receiving a spread-spectrum (SS) signal transmitted at a radio-frequency (RF) and recovering information coded therein, comprising a first demodulation stage further comprising at least one surface acoustic wave (SAW) correlator, with the first demodulation stage being adapted to receive the SS signal at an input thereof, and to demodulate the SS signal to produce an intermediate-frequency (IF) signal; and a second demodulation stage further comprising another SAW correlator, with the second demodulation stage being operatively connected to receive the IF signal, and to further demodulate the IF signal to produce a low-frequency output signal containing the information in a decoded state.

Each SAW correlator in the first demodulation stage can have a chip length that is equal to an integer n. The SAW correlator in the second demodulation stage can have a chip length that is equal to an integer m which can be the same or different from n. In this way, the apparatus can be used to recover information coded in the SS signal with a code length equal to $n \times m$ which can be, for example, equal to an integer in the range of 100-2000. The information coded in the SS signal can be coded, for example, with a binary phase shift keying (BPSK) code.

In some embodiments of the present invention, the SAW correlators of the first and second demodulation stages can be formed on a common substrate. An IF amplifier can also be connected between the first and second demodulation stages to amplify the IF signal, if needed. An antenna is can be connected to the input of the first demodulation stage to provide the SS signal thereto.

The present invention also relates to an apparatus for receiving an RF SS signal transmitted and recovering information coded therein, comprising a first SAW correlator having an input and an output, with the input of the first SAW correlator being operatively connected to an antenna to receive the SS signal; a first RF envelope detector connected to the output of the first SAW correlator to rectify the output of the first SAW correlator; a second SAW correlator with the input thereof operatively connected to the antenna to receive the SS signal; a second RF envelope detector connected to the output of the second SAW correlator to rectify the output of the second SAW correlator; a first pulse-shaping circuit connected to the first RF envelope detector to receive the rectified output of the first SAW correlator and to produce therefrom a first bipolar pulse signal having a first period inversely related to a first intermediate frequency, with the first intermediate frequency being lower than a carrier frequency of the SS signal; a second pulse-shaping circuit connected to the second RF envelope detector to receive the rectified output of the second SAW correlator and to produce therefrom a second bipolar electrical pulse signal having a second period inversely related to a second intermediate frequency, with the second intermediate frequency being lower than the carrier frequency of the SS signal; and a third correlator operatively connected to receive the first and second bipolar electrical pulse signals at an input thereof and to provide at an output thereof a low-frequency output signal containing the information in a decoded state. The third correlator can be either a SAW correlator or a digital correlator. The first and second intermediate frequencies can be substantially the same, or different.

Each pulse-shaping circuit can comprise an L-C pulse-shaping circuit. An IF amplifier can be operatively connected between the pulse-shaping circuits and the third correlator to amplify the first and second bipolar electrical pulses.

The first and second SAW correlators can each have a chip length that is equal to an integer n. The third correlator can have a chip length that is equal to an integer m. The information coded in the SS signal can have a code length equal to n×m which can be, for example, an integer in a range of 100 to 2000 or more. The information coded in the SS signal can be coded, for example, with a binary phase shift keying (BPSK) code.

The present invention also relates to a SAW correlator which is responsive to an electrical input signal having a bandwidth centered about a frequency $f_T$ and having information encoded therein with a chip length l=n×m. The SAW correlator comprises a piezoelectric substrate capable of propagating surface acoustic waves at a speed of sound v; a first input transducer further comprising a first pair of interdigitated comb electrodes arranged to form a plurality of first chips with a chip length equal to an integer n to generate a first surface acoustic wave (SAW) in the piezoelectric substrate at a first center frequency $f_0$ which is within the bandwidth of the electrical input signal; a second input transducer located proximate to the first input transducer and further comprising a second pair of interdigitated comb electrodes with a plurality of second chips having the same chip length n to generate a second SAW in the piezoelectric substrate at a second center frequency $f_1$ which is within the bandwidth of the electrical input signal; and an output transducer located proximate to the first and second input transducers and having a third pair of interdigitated comb electrodes arranged to form a plurality of third chips with the chip length being equal to an integer m, and with the output transducer having an inter-chip spacing substantially equal to $nv/f_T$ between adjacent chips of the plurality of third chips to detect the first SAW and the second SAW and to produce therefrom an electrical output signal containing the information in a decoded state. Each third chip in the output transducer can be made responsive to detect only the first SAW or the second SAW. The SAW correlator can further comprise an antenna connected to the first and second input transducers to provide the electrical input signal thereto, and an envelope detector connected to the output transducer to envelope-detect the electrical output signal.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings:

FIGS. 3A-3D show calculated signals at various locations in the SAW correlator SS receiver of FIG. 2.

DETAILED DESCRIPTION OF THE INVENTION

Figure 2:
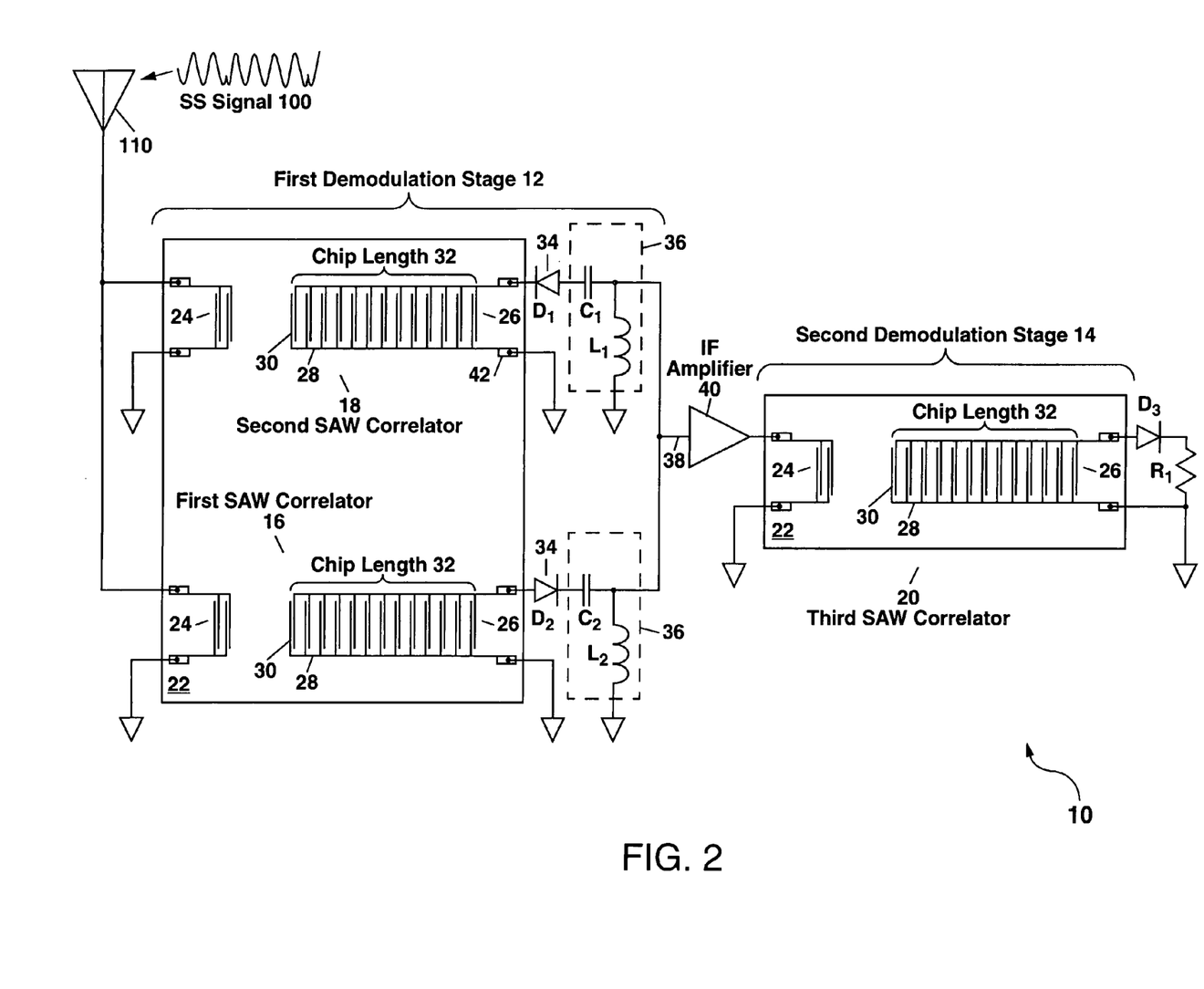
FIG. 2 shows a schematic diagram of a first example of a SAW correlator SS receiver according to the present invention comprising a first SAW correlator and a second SAW correlator in a first demodulation stage, and a third SAW correlator in a second demodulation stage.

Referring to FIG. 2, there is shown a schematic diagram of an example of an apparatus 10 for receiving a spread-spectrum (SS) signal 100 transmitted at a radio frequency (RF) to recover information coded in the transmitted SS signal 100. The apparatus 10 (also referred to herein as a SAW correlator SS receiver) comprises a first demodulation stage 12 and a second demodulation stage 14. The first demodulation stage 12 comprises a first SAW correlator 16 and a second SAW correlator 18; and the second demodulation stage 14 comprises a third SAW correlator 20. The SAW correlators 16 and 18 can be formed on a common substrate 22 as shown in FIG. 2, or on separate substrates 22. In some embodiments of the present invention, the common substrate 22 can also include the third SAW correlator 20.

The SAW correlator SS receiver 10 of the present invention splits the correlation process into two stages 12 and 14, with the SAW correlators in each stage having a chip length that does not excessively attenuate the surface acoustic wave (SAW) therein. The use of two demodulation stages 12 and 14 operating sequentially as shown in FIG. 2 allows the use of a very long code length for the SS signal 100 which would not otherwise be possible using a single SAW correlator due to the attenuation of the SAW which can become pronounced at a frequency of 2.4 GHz when the code length exceeds about 30. Since each stage 12 and 14 involves a demodulation producing a decrease in frequency at the output thereof, the SAW correlator SS receiver 10 can be thought of as being somewhat similar to a heterodyne receiver in being a two-stage device except that the apparatus 10 of the present invention does not require the use of a local oscillator and a mixer for frequency down-conversion which are essential parts of the heterodyne receiver.

Each SAW correlator 16, 18 and 20 includes a pair of interdigitated comb electrodes 28, with each comb electrode 28 further comprising a plurality of fingers 30, and with the fingers 30 of the two comb electrodes 28 being enmeshed (i.e. interdigitated). The fingers 30 are generally arranged in pairs (i.e. finger pairs), with one finger of each pair being connected to one of the comb electrodes 28, and with the other finger of each pair being connected to the other comb electrode 28.

Each finger 30 can also have a split-finger type design which can be used to reduce unwanted surface acoustic reflections. In a split-finger design, each finger 30 is split lengthwise into two portions, with the two portions each being one-eighth of a wavelength ($\lambda/8$) wide and being separated by $\lambda/8$ where the wavelength $\lambda$ corresponds to a surface acoustic wave (SAW) to be generated in the piezoelectric substrate 22.

The fingers 30 of the input transducer 24 and the output transducer 26 are arranged in sets having a predetermined spacing, with the sets of fingers 30 being termed chips, and with all the sets of fingers 30 in output transducer 26 defining the chip length 32 for a particular SAW correlator 16, 18 or 20. As an example, the SAW correlators 16 and 18 in the first demodulation stage 12 can each have a chip length of n; and the SAW correlator 20 in the second demodulation stage 14 can have a chip length of m. The exact values of n and m can be selected to provide a product n×m=l where l is a code length of the transmitted SS signal 100 to be received by the apparatus 10. As an example, when n=m=31, then an SS signal 100 having a code length of l=31²=961 can be received by the apparatus 10. As another example, when n=31 and m=63, then l=1953.

The SAW correlators 16 and 18 in the first demodulation stage 12 operate at a center frequency which corresponds to the RF frequency of the SS signal 100. The SAW correlator 20 in the second demodulation stage 14, however, operates at a much lower intermediate frequency (also referred to herein as IF or IF frequency). This use of a third SAW correlator 20 according to the present invention allows the value of m to be made larger than n since the acoustic attenuation at the IF frequency is less than that at the RF frequency.

The SS signal 100 can be a binary phase shift keying (BPSK) signal in which information is encoded using 180 degree phase transitions in the waveform of a sinusoidal carrier frequency (i.e. the RF frequency). The carrier frequency can be, for example, in the industrial, scientific and medical (ISM) band at 2.4 GHz, or at an arbitrary frequency.

Figure 3A:
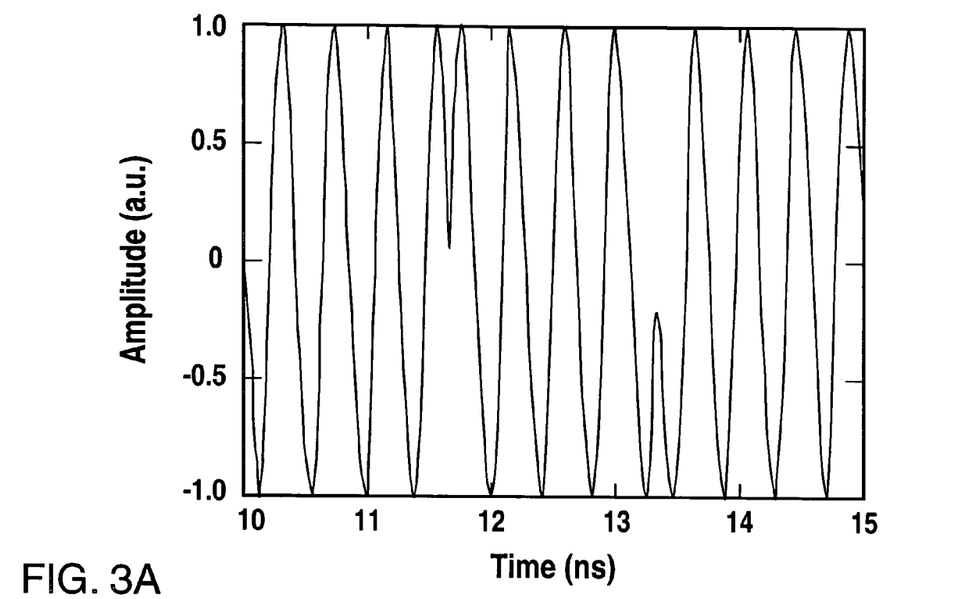
FIG. 3A shows a portion of a spread spectrum (SS) signal which is connected to the inputs of each SAW correlator in the first demodulation stage in FIG. 2.
Figure 3B:
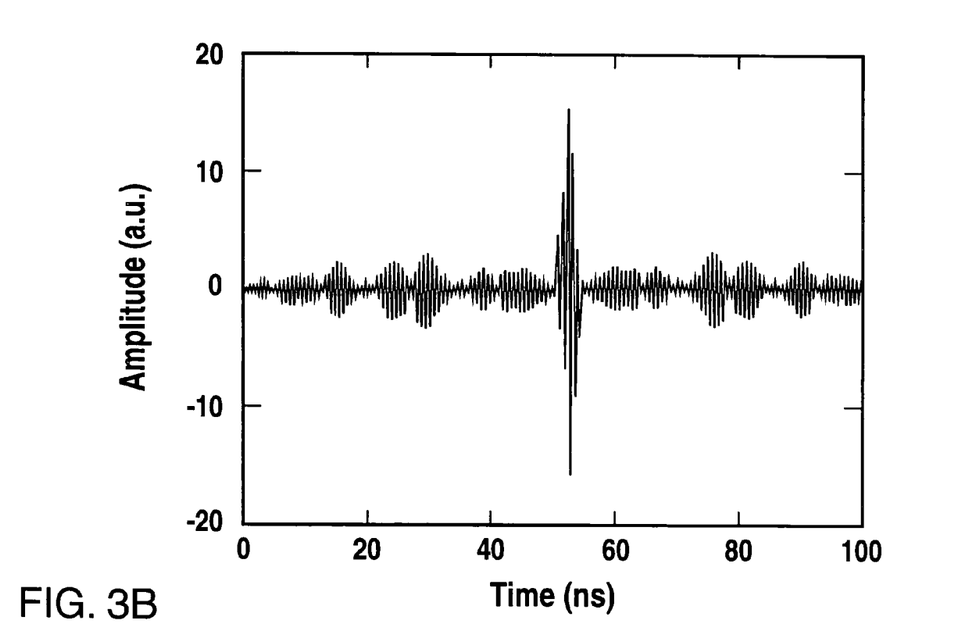
FIG. 3B shows a correlated output at the output transducer of the first SAW correlator in FIG. 2.

In the example of FIG. 2, the SS signal 100 can be received into the apparatus 10 using an antenna 110 which is operatively connected to the input transducers 24 of the SAW correlators 16 and 18 in the first demodulation stage 12. The input transducers 24 of the SAW correlators 16 and 18 are stimulated by the SS signal 100 to generate a surface acoustic wave (SAW) in the substrate 22 at the center frequency (e.g. 2.4 GHz) of the SAW correlators 16 and 18. The output transducers 26 of the SAW correlators 16 and 18 then perform a matched filter operation on the SAW and convert a correctly-phase-coded SAW for each correlator 16 and 18 into an electrical output signal in the form of an RF modulated electrical pulse. FIG. 3A shows a portion of a simulated BPSK phase-modulated SS signal 100 with a 2.4 GHz center frequency at the input transducer 24 of the SAW correlator 16. FIG. 3B shows on a different time scale a calculated electrical output signal at the output transducer 26 for the same SAW correlator 16 to illustrate the RF modulated electrical pulse generated by the SAW correlator 16. The number of cycles in the RF modulated electrical pulse has been reduced in FIG. 3B for clarity to show the undulating nature of the RF modulated electrical pulse. In actuality, for the 2.4 GHz center frequency, there would be 2.4 cycles per nanosecond.

For a correctly phase-coded input signal, the electrical output appears as the relatively large RF modulated electrical pulse near the middle of FIG. 3B. For an incorrectly phase-coded input signal, the electrical output signal appears similar to broadband noise which accounts for the much lower-level signals at other times in FIG. 3B.

The two SAW correlators 16 and 18 in the first demodulation stage 12 are different, either in their phase codes, or in their center frequencies, or both. Each SAW correlator 16 and 18 will respond to the received SS signal 100 to generate a substantial electrical output signal at the output transducer 26 therein if and only if the received SS signal 100 contains a sequence of correctly coded signals at the center frequency of that SAW correlator. As an example, the two SAW correlators 16 and 18 can operate at the same center frequency and be adapted to respond to orthogonal BPSK codes in the received SS signal 100 so that for any received BPSK code only one of the SAW correlators 16 or 18 will generate a substantial electrical output signal, with the other SAW correlator providing a minimal electrical output signal (i.e. broadband pseudo noise) in response to the same BPSK code. The orthogonal BPSK codes can comprise Barker codes for n≤13, or maximal length sequence (m-sequence) codes. The exact BPSK code to generate an electrical output for each SAW correlator 16 and 18 will be determined by the arrangement of chips for that SAW correlator.

Each SAW correlator 16 and 18 further provides a process gain which depends on the chip length 32. The process gain corresponds to a peak-to-sidelobe (PSL) ratio of the RF modulated electrical pulse generated by the SAW correlators 16 and 18. When the SAW correlators 16 and 18 are designed to detect a Barker code, the process gain is ideally equal to the chip length n. For other types of orthogonal codes, such as the m-sequence codes, the process gain is more typically $(4n)^{1/2}$ or less.

In FIG. 2, the RF modulated electrical pulse generated by each SAW correlator 16 and 18 is fed into an RF envelope detector 34 (e.g. a microwave detector Schottky diode). Each RF envelope detector 34 operates in some combination of linear and square-law operation, depending upon the strength of its input signal (i.e. the RF modulated electrical pulse generated by the SAW correlator 16 or 18). The RF envelope detector 34 for the SAW correlator 16 is configured to rectify the RF modulated electrical pulse to produce a positive pulse corresponding to the envelope of the RF modulated electrical pulse. This positive pulse signal is shown in the calculated result of FIG. 3C which takes into account filtering by a combination of parasitic and added capacitance at the output of the RF envelope detector 34 and the resistance of the RF envelope detector 34, and is denoted herein as a +1 code pulse. The RF envelope detector 34 for the SAW correlator 18 is oppositely configured to rectify the RF modulated electrical pulse to produce a negative pulse corresponding to the envelope of the RF modulated electrical pulse generated therein; and this is denoted as a −1 code pulse. The +1 code pulses and the −1 code pulses are generated in at different times as each SAW correlator 16 and 18 detects orthogonal BPSK code sequences in the received SS signal 100.

To most effectively drive the input transducer 24 of the third SAW correlator 20 in the second demodulation stage 14, the +1 and −1 code pulses can be converted into bipolar pulses (also termed bipolar electrical pulse signals, or bipolar pulse signals) to better approximate a BPSK signal at the IF frequency. This can be done using a passive L-C pulse-shaping circuit 36 as shown in FIG. 2. The pulse-shaping circuit 36 comprises a damped L-C high-pass filter with a time constant that stretches out the +1 and −1 code pulses to approximate a single cycle of a sine wave at the IF frequency which is substantially equal to the center frequency of the third SAW correlator 20. The single sine wave cycle of each bipolar pulse provides a relatively wide bandwidth centered about the IF frequency as compared with a pure sinusoidal signal.

Figure 3C:
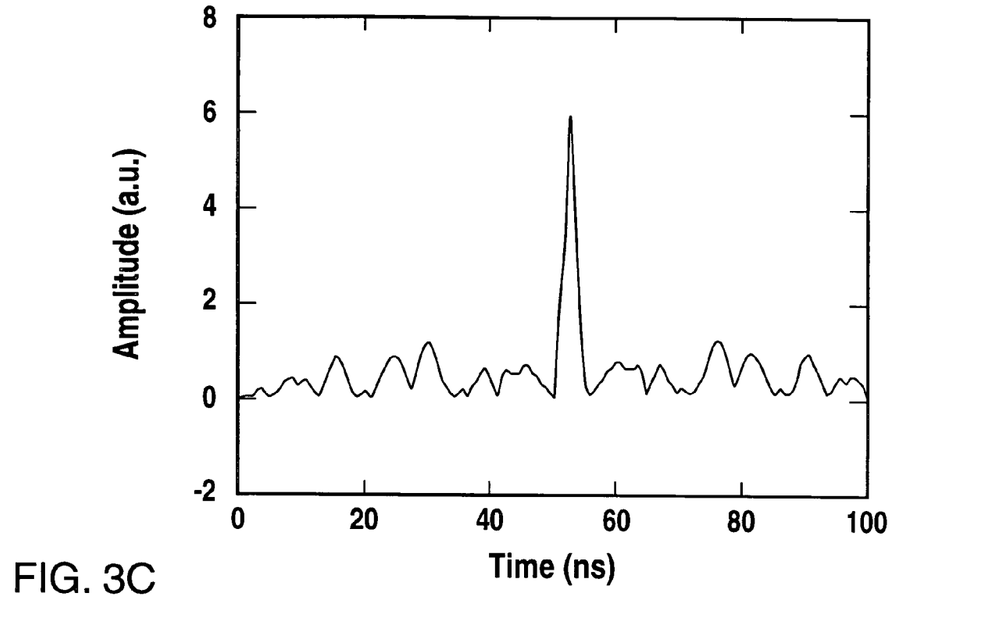
FIG. 3C shows a rectified output of an RF envelope detector $D_2$ connected to the first SAW correlator in FIG. 2 as modified by capacitive loading.
Figure 3D:
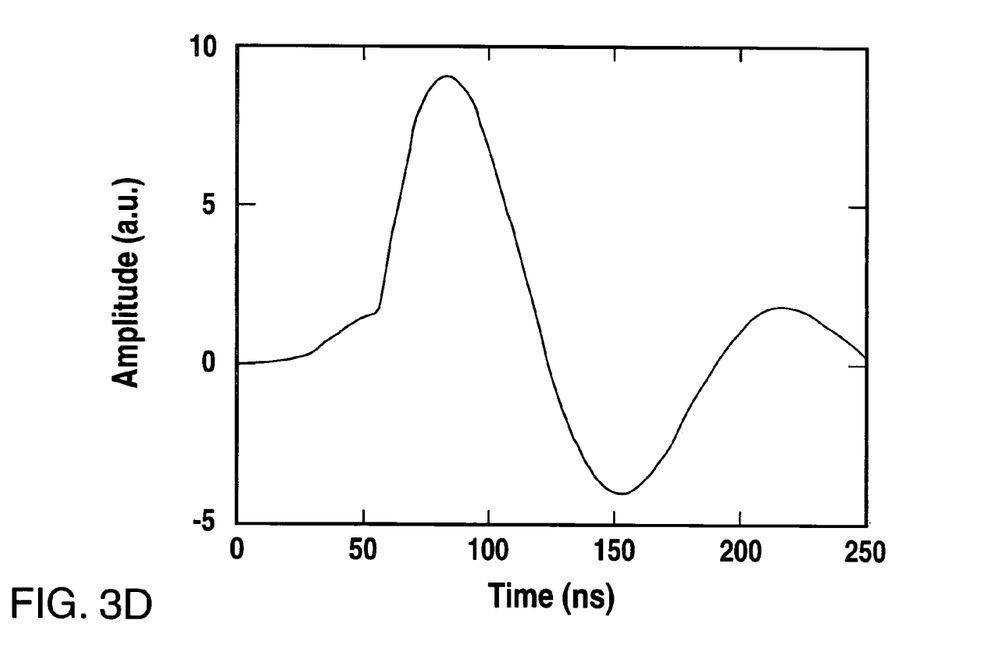
FIG. 3D shows a bipolar electrical pulse signal produced at the output of a pulse-shaping circuit connected to the RF envelope detector $D_2$ in FIG. 2. The scale for the amplitude for each calculated signal is in terms of arbitrary units (a. u.).

With an input of the +1 code pulse of FIG. 3C, the calculated bipolar pulse signal is shown in FIG. 3D at the output of the pulse-shaping circuit 36 connected to the RF envelope detector $D_2$ in FIG. 2. The bipolar pulse signal in FIG. 3D, which is the result of demodulation of a portion of the SS signal 100 by the first demodulation stage 12, has been stretched to have a period which is inversely related to the IF frequency. The IF frequency can be adjusted slightly by selecting the values of the capacitance $C_1$, $C_2$ and inductance $L_1$, $L_2$ used for the pulse-shaping circuits 36. For the simulated results of FIGS. 3A-3D, the SAW correlators 16 and 18 were each assumed to have 31 chips and to operate at a center frequency of 2.4 GHz, with the IF frequency being about 62 MHz.

The phase of the bipolar pulse signal generated by the pulse-shaping circuit 36 from the +1 code pulse shown in FIG. 3D starts with a rising edge, while the bipolar pulse signal generated from the −1 code pulse starts with a falling edge. Thus, the phasing of the bipolar pulse signals from the two SAW correlators 16 and 18 are exactly opposite (i.e. phase reversed). Thus, the two phase-reversed bipolar pulse signals can be combined either by a direct connection as shown in FIG. 2 or with a Wilkinson coupler to produce a new frequency down-converted BPSK input signal 38 at the IF frequency. An optional low-power IF amplifier 40 can be used in the SAW correlator SS receiver 10 to amplify the signal 38 prior to the second demodulation stage 14. This amplifier 40 can have a gain of 20 dB and a bandwidth of 100 MHz.

The BPSK input signal 38 produced from the SS signal 100 by the first demodulation stage 12 can be further demodulated in the second demodulation stage 14 using the third SAW correlator 20 which generates a low-frequency output signal whenever the input signal 38 matches a BPSK code sequence programmed into the third SAW correlator 20 using a predetermined arrangement of chips therein. The bandwidth of the low-frequency output signal can be about 200 kHz.

In the example of FIG. 2, the low-frequency output signal can be detected using another envelope detector (e.g. a microwave detector Schottky diode $D_3$ operating in its square law region with an input impedance which is matched to the output transducer 26 of the third SAW correlator 20). Since the third SAW correlator 20 operates at a much lower center frequency than the SAW correlators 16 and 18, the output transducer 26 in the third SAW correlator 20 can be connected to a load impedance of 50Ω or more. The use of a load impedance $R_1$ larger than 50Ω provides an opportunity to increase the voltage of the low-frequency output signal even though power has been lost through the correlation process in the SAW correlator SS receiver 10.

Furthermore, the lower center frequency of the third SAW correlator 20 produces a much smaller propagation loss for the surface acoustic wave therein, and this means that the chip length 32 of the third SAW correlator 20 can be made much larger than that of the SAW correlators 16 and 18. As an example, the third SAW correlator 20 can comprise 63 chips on a 3-inch diameter $LiNbO_3$ substrate 22. With the SAW correlators 16 and 18 in the first demodulation stage 12 operating at 2.4 GHz with a chip length of 31, a combined chip length n×m=31×63=1953 chips is feasible for the information encoded on the SS signal 100. Still longer codes are possible for the SS signal 100 by using a broader bandwidth for the SAW correlators 16 and 18 with fewer pairs of fingers per chip. This will increase the IF frequency and shorten the length of the third SAW correlator 20 thereby allowing a larger chip length 32 therein for a given size substrate 22.

The apparatus 10 of FIG. 2 was built with the SAW correlators 16 and 18 operating at a 2.43 GHz center frequency with orthogonal codes 31 chips long. Each chip of the output transducer 26 for the SAW correlators 16 and 18 contained 30 finger pairs to provide a bandwidth of 3.3% (i.e. 80 MHz bandwidth). The input transducer 24 for the SAW correlators 16 and 18 can comprise up to 30 pairs of fingers 30.

The RF envelope detectors 34 connected to the output transducers 26 of the SAW correlators 16 and 18 were microwave detector Schottky diodes which were matched to about 100Ω impedance at their input side connected to the output transducers 26 and matched to about 400Ω impedance at their output side which was connected to the pulse-shaping circuit 36. This provides near an optimum match to the SAW correlators 16 and 18; and the increase in impedance through the RF envelope detectors 34 allows for an increase in signal voltage. The pulse bandwidth out of the RF envelope detectors 34 in the fabricated device 10 is 80 MHz.

The use of passive RF envelope detectors 34 can produce significant attenuation in the SAW correlator SS receiver 10 which can be compensated for by using the IF amplifier 40. In other embodiments of the apparatus 10, active (i.e. biased) RF envelope detectors 34 can be used to reduce the attenuation.

The L-C pulse-shaping circuit 36 was fabricated with a self-resonant frequency of 8 MHz. This circuit 36 produced bipolar pulses at an IF frequency of 62 MHz. The +1 and −1 bipolar pulses were coupled together using a Wilkinson coupler, and the resultant BPSK input signal 38 was amplified using an IF amplifier 40 having a gain of 20 dB and a bandwidth of 100 MHz. If an active RF envelope detector 34 drawing about 0.5 mW power is used in place of the passive RF envelope detector 34, then no IF amplifier 40 is typically needed. The output of the IF amplifier 40 is coupled into the third SAW correlator 20.

The third SAW correlator 20 operated with a center frequency of 62 MHz, and with a bandwidth of 3.6 MHz. The chip length in the third SAW correlator 20 was equal to 13, with 24 finger pairs per chip for the output transducer 26 and 8 finger pairs for the input transducer 24. The third SAW correlator 20 was fabricated on a YZ-cut lithium niobate ($LiNbO_3$) substrate 22 with an overall length of about 2 centimeters. The chip length of 13 allowed the use of a Barker code for coding the chips in the third SAW correlator 20.

Each of the SAW correlators 16, 18 and 20 was built on a lithium niobate substrate 22 using 50 nanometers (nm) of aluminum metallization for the fingers 30. Two microns of gold metallization was used to form bus-bars connecting the fingers 30 of each interdigitated comb electrode 28, and also to form contact pads 42 for the electrodes 28. The overall code length (n×m) for this device 10 was 403 chips (i.e. 31×13).

To produce a low-frequency output signal from this fabricated device 10, the SS signal 100 must be coded with a BPSK code sequence which comprises 290,160 cycles at 2.43 GHz with 403 phase transitions in the correct locations, and with the correct phases throughout. The SAW correlator SS receiver 10 very strongly rejects any signal that is not at exactly the correct frequency with exactly the correct input code.

The low-frequency output signal for the fabricated device 10 had a peak output voltage of 50 milliVolts (mV) into a 100 kΩ load, $R_1$, for a combined input power to the SAW correlators 16 and 18 of 0 dBm, and using an IF amplifier 40 having a gain of 20 dB. The bandwidth of the detected low-frequency output signal was about 200 kHz. Further improvements in the detected signal level are expected as the performance of the RF envelope detectors 34 and SAW correlators 16, 18 and 20 are optimized.

The apparatus 10 can be used, for example, as a low-power wake-up receiver with the low-frequency output signal being triggered by the coded SS signal 100 and used to switch on a conventional high-power receiver. This is useful for conserving battery power for the high-power receiver while on stand-by awaiting the receipt of a coded SS signal 100 to be transmitted. Since the SAW correlators 16, 18 and 20 operate passively, the only electrical power required for the SAW correlator SS receiver 10 is used in biasing the RF envelope detectors 34 and/or diode $D_3$ to reduce the loss therein, and also to operate the IF amplifier 40, if used. The electrical power consumption can be on the order of 40 microWatts (μW) for biasing the RF envelope detectors 34 and the diode $D_3$ and for powering the IF amplifier 40. The addition of another amplifier (not shown) for the low-frequency output signal can further increase the sensitivity of the apparatus 10 while only modestly increasing the electrical power consumption to about 60 μW. For comparison, a typical button-cell battery has an internal dissipation while sitting on a shelf which ranges from 3-30 μW. Thus, the above power levels for the SAW correlator SS receiver 10 should allow battery operated use with a substantial lifetime on the order of the shelf life of the battery.

Fabrication of the SAW correlators 16, 18 and 20 can be performed as described hereinafter with reference to FIGS. 4A-4J which depict schematic cross-section views of a portion of a substrate 22 used for the SAW correlators 16, 18 and 20. For clarity, only a small number of fingers 30 of the interdigitated comb electrodes 28 are shown. Furthermore, although FIGS. 4A-4J depict fabrication of only a single SAW correlator, those skilled in the art will understand that multiple SAW correlators can be formed on a single substrate 22 and later separated for packaging as individual devices or as multiple devices on a common substrate 22. Thus, in some embodiments of the present invention, the SAW correlators 16 and 18 can be fabricated on the same substrate 22 as shown in FIG. 2. In other embodiments of the present invention, all of the SAW correlators 16, 18 and 20 can be provided on a common substrate 22.

Figure 4A:
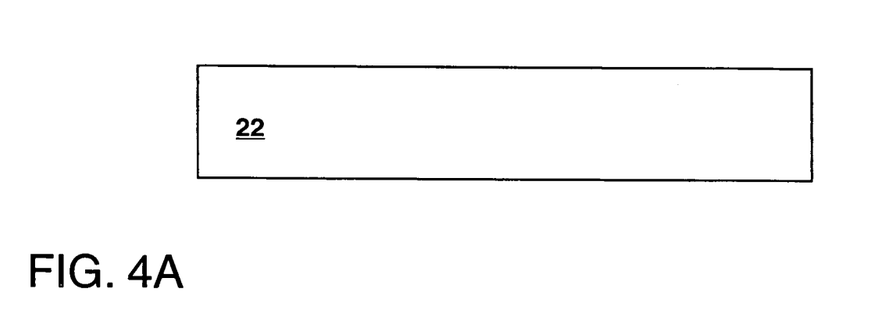
FIGS. 4A-4J show schematic cross-section views for a portion of a SAW correlator transducer to illustrate fabrication of the SAW correlators in FIG. 2 using electron beam lithography.

In FIG. 4A, a piezoelectric substrate 22 is provided which can be a 100-mm-diameter YZ-cut lithium niobate ($LiNbO_3$) wafer. The substrate 22 can be cleaned with an organic solvent rinse (e.g. acetone, followed by methanol, followed by isopropanol) and an deionized water rinse, and then blown dry in air.

Figure 4B:
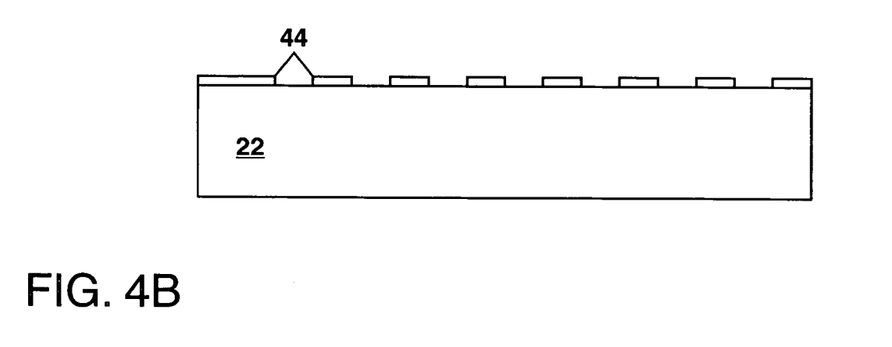

A layer a polymethylmethacrylate (PMMA) electron resist can then be spin coated over the substrate 22 and exposed by electron beam lithography and subsequently developed to provide a patterned PMMA layer 44 as shown in FIG. 4B. Electron beam lithography is generally required for the SAW correlators 16 and 18 when operation of these SAW correlators occurs at center frequencies above 800 MHz. For operation at 2.4 GHz, the minimum lithographic dimension needed for fabrication of the SAW correlators 16 and 18 with a split-finger type design on a $LiNbO_3$ substrate 22 is 0.18 μm. Fabrication of the third SAW correlator 20 can be performed using conventional photolithography to pattern a photoresist since the minimum lithographic dimension for this SAW correlator 20 is much larger due to its operation at a much smaller center frequency (e.g. 62 MHz).

Figure 4C:
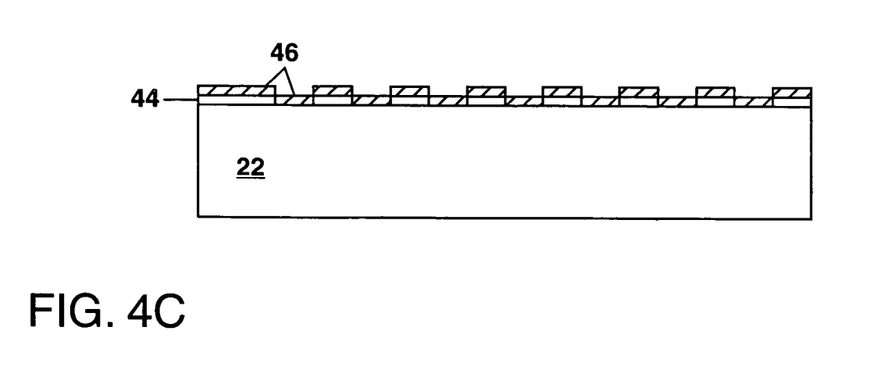

In FIG. 4C, a layer 46 of aluminum is blanket deposited over the substrate 22 and over the patterned PMMA layer 44 by evaporation or sputtering. This aluminum layer 46 can be 50 nm thick. The use of a thin layer 46 helps to minimize acoustic reflections from the input and output transducers 24 and 26.

Figure 4D:
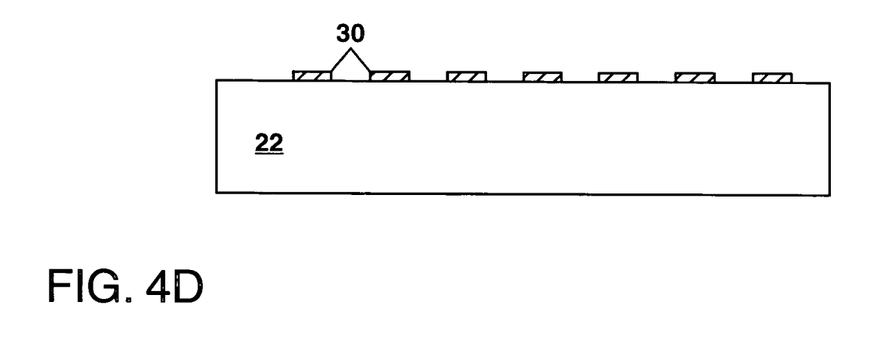

In FIG. 4D, the patterned PMMA layer 44 is removed by a lift-off step, thereby removing portions of the aluminum layer 46 deposited on the patterned PMMA layer 44, and leaving intact those portions of the aluminum layer 46 which were directly deposited onto the substrate 22. The remaining portions of the aluminum layer 46 on the substrate 22 will form the fingers 30 of the transducers 24 and 26, and also begin to build up the remainder of the interdigitated comb electrodes 28 including bus-bars which provide electrical interconnections between the aluminum fingers 30 of each electrode 28 and which provide an electrical connection to contact pads 42 at one end of each electrode 28. The aluminum layer 46 is also used to begin to build up the contact pads 42. After the lift-off step, the substrate 22 can be cleaned using solvent and oxygen plasma cleaning processes to remove any organic residue left by the patterned PMMA layer 44.

Figure 4E:
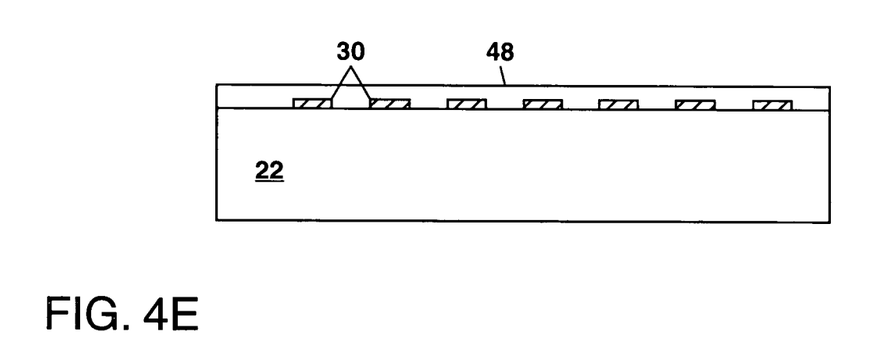

To protect the aluminum fingers 30 during subsequent processing whereby the contact pads 42 and bus-bars are further built up, a blanket layer of silicon nitride 48 can be deposited by plasma-enhanced chemical vapor deposition (PECVD) as shown in FIG. 4E. This is necessary since liquid photoresist developers are strong bases that can etch the aluminum fingers 30. The silicon nitride layer 48 can be, for example, 0.5-1 μm thick.

Figure 4F:
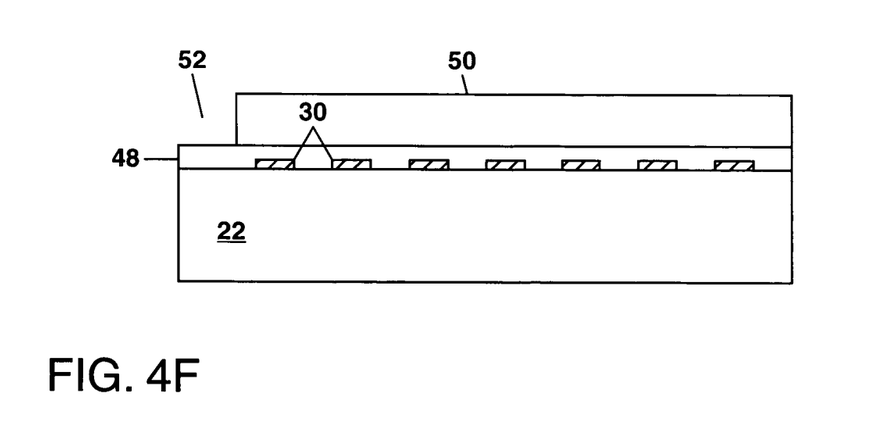

In FIG. 4F, a layer 50 of an optical photoresist can be spun onto the substrate 22 and photolithographically exposed and developed at regions wherein the contact pads 42 and bus-bars are to be formed. Optical photolithography can be used to define the contact pads 42 and bus-bars which have much larger widths than the fingers 30. Openings 52 are formed through the developed silicon nitride layer 50 at locations wherein the contact pads 42 and bus-bars will be further built up.

Figure 4G:
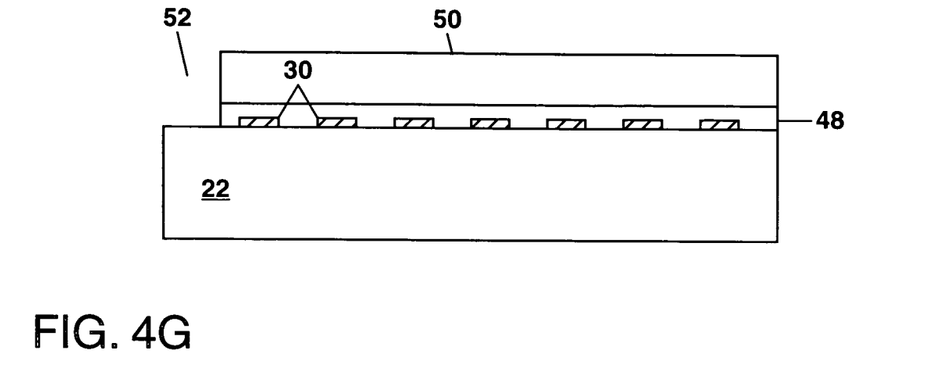

In FIG. 4G, the remaining photoresist layer 50 is used as an etch mask to remove the silicon nitride layer 50 at the locations where the contact pads 42 and bus-bars will be further built up. This can be done using a dry plasma etching step which removes the silicon nitride without substantially attacking aluminum.

Figure 4H:
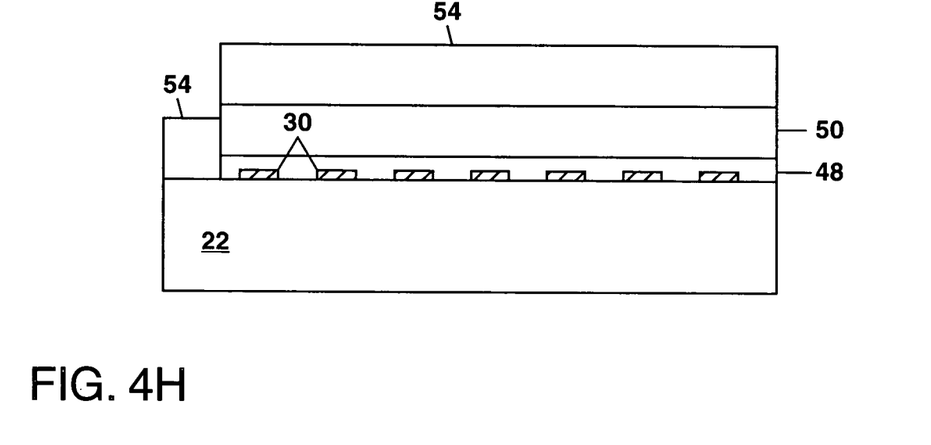
Figure 4I:
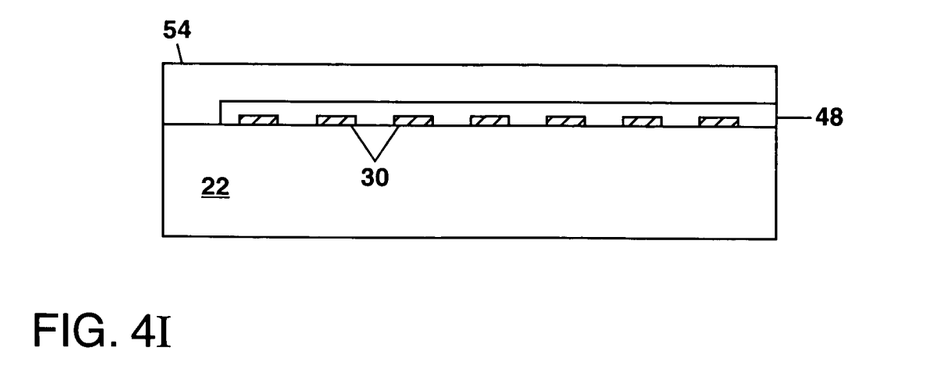

In FIG. 4H, a chrome-gold metallization 54 can be provided to further build up the contact pads 42 and the bus-bars. This can be done by initially blanket depositing an adhesion layer of chromium about 15 nm thick over the substrate 22 by evaporation or sputtering, followed by a blanket deposition of a layer of gold about 0.5 μm thick. The chrome-gold metallization 54 provides mechanical bond strength and good electrical conductivity for electrical signals into and out from the SAW correlators 16, 18 and 20.

Figure 4J:
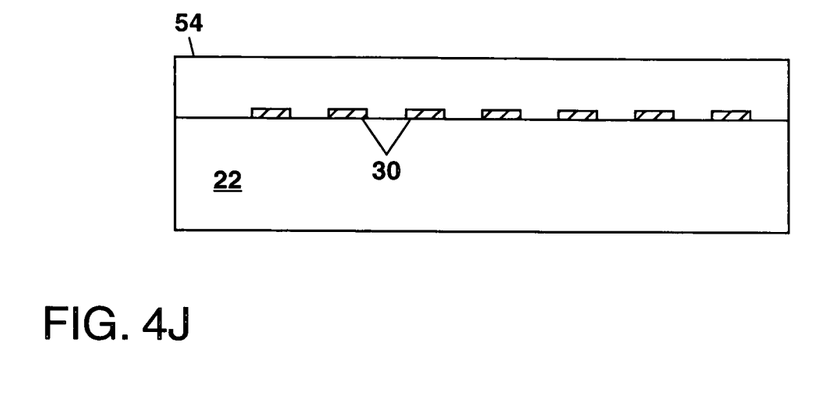

After deposition of the chrome-gold metallization 54, another lift-off step can be performed to remove the remaining optical photoresist layer 50 and the chrome-gold metallization 54 overlying the photoresist layer 50. At this point, the contact pads 42 and the bus-bars have been completed, but the silicon nitride layer 48 still covers the aluminum fingers 30. The silicon nitride layer 48 can be removed by another dry plasma etching step to form the completed SAW correlator as shown in FIG. 4J.

Figure 5:
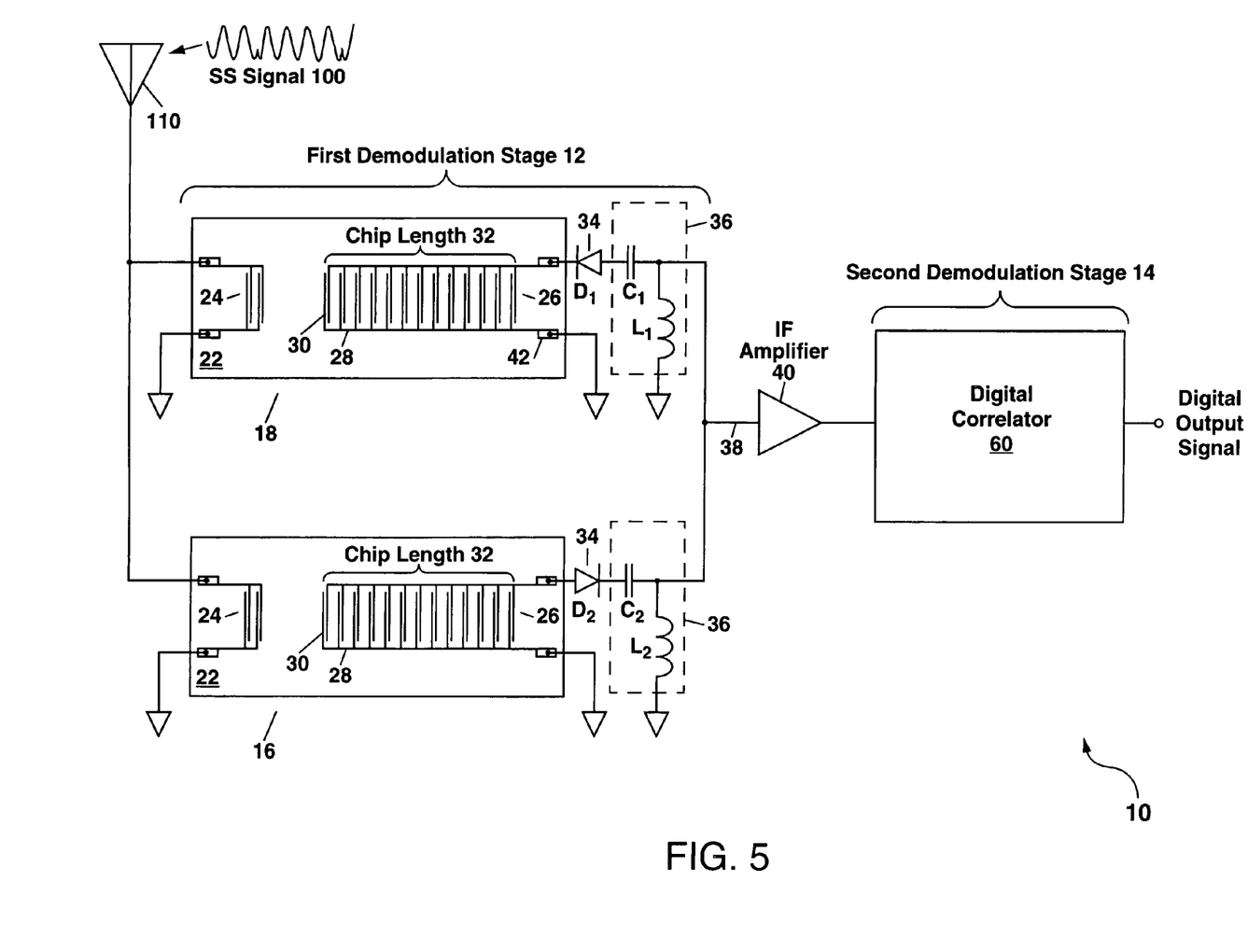
FIG. 5 shows a schematic diagram of a second example of the SAW correlator SS receiver according to the present invention formed using a pair of SAW correlators in the first demodulation stage and a digital correlator in the second demodulation stage.

In another example of the present invention schematically illustrated in FIG. 5, a digital correlator 60 can be substituted for the third SAW correlator 20 in the second demodulation stage 14. Digital correlators are generally not fast enough to be used for the SAW correlators 16 and 18 in the first demodulation stage 12, but such digital correlators have adequate speed at the IF frequency to be substituted for the third SAW correlator 20.

The use of a digital correlator 60 as shown in FIG. 5 provides a low-frequency output signal which is at zero voltage in the absence of a properly detected SS signal 100, and at a digital output level (e.g. 3.3 volts) for a properly detected SS signal 100. Since the digital correlator 60 operates at the IF frequency, it can operate with a relatively low power consumption of a few tens of microWatts. The digital correlator 60 can be integrated together with the IF amplifier 40 if desired to provide gain control for the IF amplifier 40 so that the SAW correlator SS receiver 10 can be used over a wide range of signal strength for the received SS signal 100. Additionally, the digital correlator 60 can be programmable to change the code for the second demodulation stage 14.

A 16-chip (i.e. 16-bit) digital correlator 60 can be formed using a pair of 8-bit serial-to-parallel shift registers which are connected in series and driven at the IF frequency by the BPSK input signal 38 after amplification and conversion of the BPSK signal 38 to a digital signal. Clocking of the serial-to-parallel shift registers is also performed using the digitized BPSK signal 38. Eight parallel outputs of each 8-bit serial-to-parallel shift register can be fed through switches which select between an inverted or a non-inverted form of each output. After the switches, the various inverted or non-inverted forms of the outputs of the serial-to-parallel shift registers can be fed through a series of logical "AND" gates to generate a single digital output signal having a logic state that indicates when the BPSK input signal 38 matches a unique 16-bit code programmed into the digital correlator 60 using the switches. This unique 16-bit code can be reprogrammed as needed using the switches. A schematic circuit diagram which implements one example the digital correlator 60 of the present invention can be found in a report by Robert W. Brocato entitled "A Zero-Power Radio Receiver" (Sandia National Laboratories, Report No. SAND2004-4610, September 2004), which is incorporated herein by reference, and which is available from the U.S. Department of Commerce, National Technical Information Service.

In other embodiments of the present invention, additional 8-bit serial-to-parallel shift registers can be added to provide a code length longer than 16 bits for the apparatus 10. Those skilled in the art will understand that other types of digital correlators as known to the art can be used for practice of the present invention.

Figure 6:
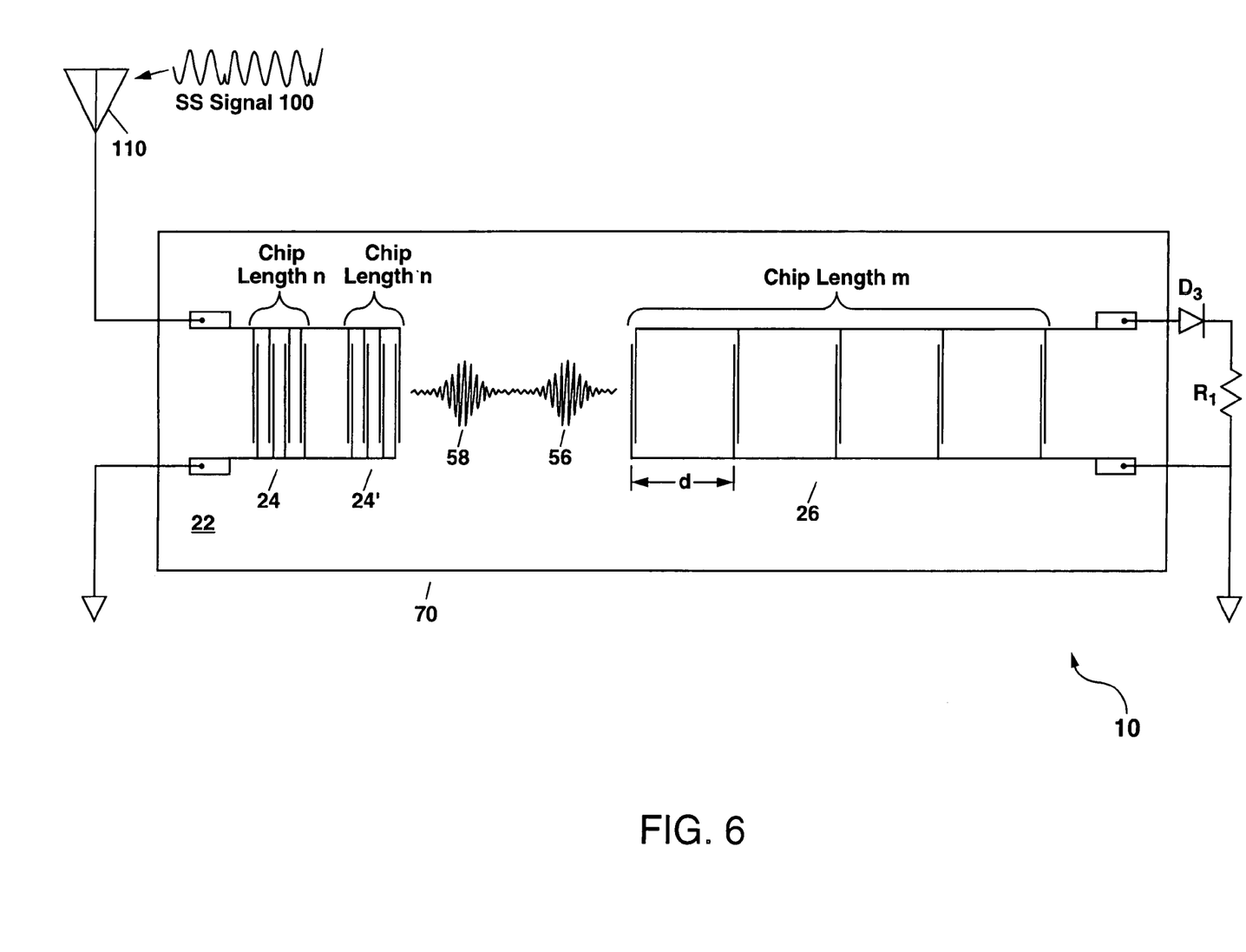
FIG. 6 shows a schematic diagram of a third example of the SAW correlator SS receiver according to the present invention formed using a compound SAW correlator having a pair of input transducers with a chip length n and an output transducer with a chip length m, with the SAW correlator decoding a SS signal having a code length l=n×m.

In other embodiments of the present invention, the SAW correlator SS receiver 10 can comprise a compound SAW correlator 70 as schematically illustrated in FIG. 6. The compound SAW correlator 70 comprises a pair of input transducers 24 and 24' and a single output transducer 26. Each of the input transducers 24 and 24' in the example of FIG. 6 operate at a different center frequency denoted as $f_0$ and $f_1$, respectively. The center frequencies $f_0$ and $f_1$ are within a bandwidth of the SS signal 100 to be received, which is centered about a frequency $f_T$. Each of the input transducers 24 and 24' have a chip length which is equal to an integer n. The output transducer 26 is responsive to detect SAWs 56 and 58 which can be generated by the two input transducers 24 and 24' at different times. The output transducer 26 can have a chip length equal to an integer m which can be the same as n, or different. Each chip in the output transducer 26 is separated from adjacent chips by an inter-chip spacing $d=nv/f_T$ where v is the speed of sound along the axis of propagation of the SAWs 56 and 58. In this way, the compound SAW correlator 70 can be used to demodulate the received SS signal 100 having a chip length $l=n \times m$.

The compound SAW correlator 70 in FIG. 6 can be fabricated on a piezoelectric substrate 22 (e.g. comprising $LiNbO_3$) as previously described with reference to FIGS. 4A-4J. The input transducers 24 and 24', which are located substantially in-line with each other and with the output transducer 26, can have different arrangements of fingers 30 to form chips which respond to different and preferably orthogonal code sequences (e.g. BPSK code sequences). The term "substantially in-line" as used herein means that at least a portion of a SAW 56 produced by the input transducer 24 passes beneath the input transducer 24' and the output transducer 26.

Additionally, the input transducers 24 and 24' have different center frequencies $f_0$ and $f_1$ within the bandwidth of the SS signal 100 (e.g. in a band centered about 2.4 GHz) which are sufficiently separated in frequency so that the SAW 56 generated in the piezoelectric substrate 22 by the input transducer 24 produces little, if any, interaction with the other input transducer 24' as the SAW 56 travels beneath the transducer 24' (see FIG. 6). In this way, each input transducer 24, 24' operates independently to generate the SAWs 56 and 58. The SAWs 56 and 58 can be generated repeatedly over time in response to the BPSK code sequences in the SS signal 100, with each SAW 56 and 58 being spatially separated in the substrate 22 as schematically illustrated in FIG. 6.

Each correlation peak in the SAW 56 or 58 is produced in response to a properly detected code sequence of the SS signal 100 of code length n. For purposes of illustration, the SAW 56 can be thought of as representing a +1 code acoustic pulse; and the SAW 58 can be thought of as representing a −1 code acoustic pulse. The +1 and −1 code acoustic pulses, which are repeated over time and spatially separated in the substrate 22, form another code sequence (e.g. a BPSK code sequence) of code length m which is contained in the received SS signal 100 in addition to the detected code sequence of code length n. This second code sequence of code length m can be subsequently decoded using the output transducer 26 as the SAWs 56 and 58 pass beneath the output transducer 26. As previously described, Barker codes, maximal length sequence (m-sequence) codes, or any type of code known to the art can be used for the code sequences n and m present in the SS signal 100 and built into the arrangement of chips in the transducers 24, 24' and 26. The code sequences n and m can use the same or different types of coding.

In FIG. 6, the output transducer 26 contains a plurality of chips which are separated by the inter-chip spacing d. Each chip in the output transducer 26 can be made responsive to only one of the SAWs 56 or 58 (i.e. responsive to detect either a +1 code acoustic pulse, or a −1 code acoustic pulse) by control of the inter-chip spacing and the phasing of the fingers 30 forming that chip.

When a code sequence of length m with the appropriate phasing is correctly detected by the output transducer 26, an electrical output signal is generated. The electrical output signal can be envelope detected using an envelope detector (e.g. diode $D_3$ which can be a microwave detector Schottky diode operating in its square law region). Each output pulse in the enveloped-detected output signal indicates a correctly received signal of code length $l=n \times m$ in the SS signal 100. Otherwise the envelope-detected output signal from the output transducer 26 appears similar to broadband pseudo noise.

Although the compound SAW correlator 70 has been described in terms of its use in forming the SAW correlator SS receiver 10 as schematically illustrated in the example of FIG. 6, those skilled in the art will understand that the compound SAW correlator 70 can be used for other signal processing applications that do not require the use of an antenna 110, or envelope detector. Those skilled in the art will also understand that the compound SAW correlator 70 can also be formed with the input transducers 24 and 24' located side-by-side rather than being substantially in-line as shown in FIG. 6. In a side-by-side compound SAW correlator 70, the input transducers 24 and 24' can be located adjacent to each other, with each input transducer 24 and 24' being fed the SS input signal 100, and with the SAWs 56 and 58 generated by the input transducers 24 and 24' being directed towards the single output transducer 26. For such other embodiments of the present invention the center frequencies $f_0$ and $f_1$ can be the same or different for the two input transducers 24 and 24'.

Those skilled in the art will understand that other types coding including frequency-shift keying (FSK), quadrature phase shift keying (QPSK), offset quadrature phase shift keying (OQPSK), minimum shift keying (MSK), Gaussian minimum shift keying (GMSK), on-off keying (OOK) and any other type of coding known to the art including chirp modulation can be used in the SAW correlator SS receiver 10 and the compound SAW correlator 70 of the present invention. Additionally, those skilled in the art will understand that other types of piezoelectric substrates 22 can be used for the SAW correlator SS receiver 10 and the compound SAW correlator 70 of the present invention, including substrates formed from crystalline quartz and gallium arsenide. The term "piezoelectric substrate" as used herein is intended to include any substrate material having a piezoelectric film deposited thereon, including an aluminum oxide substrate having an aluminum nitride film deposited thereon.

The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An apparatus for receiving a spread-spectrum (SS) signal transmitted at a radio-frequency (RF) and recovering information coded therein, comprising:
  (a) a first surface acoustic wave (SAW) correlator having an input and an output, with the input of the first SAW correlator being operatively connected to an antenna to receive the SS signal;
  (b) a first RF envelope detector connected to the output of the first SAW correlator to rectify the output of the first SAW correlator;
  (c) a second SAW correlator with the input thereof operatively connected to the antenna to receive the SS signal;
  (d) a second RF envelope detector connected to the output of the second SAW correlator to rectify the output of the second SAW correlator;
  (e) a first pulse-shaping circuit connected to the first RF envelope detector to receive the rectified output of the first SAW correlator and to produce therefrom a first bipolar pulse signal having a first period inversely related to a first intermediate frequency, with the first intermediate frequency being lower than a carrier frequency of the SS signal;
  (f) a second pulse-shaping circuit connected to the second RF envelope detector to receive the rectified output of the second SAW correlator and to produce therefrom a second bipolar electrical pulse signal having a second period inversely related to a second intermediate frequency, with the second intermediate frequency being lower than the carrier frequency of the SS signal; and
  (g) a third correlator operatively connected to receive the first and second bipolar electrical pulse signals at an input thereof and to provide at an output thereof a low-frequency output signal containing the information in a decoded state.

2. The apparatus of claim 1 further comprising an intermediate-frequency (IF) amplifier operatively connected between the pulse-shaping circuits and the third correlator to amplify the first and second bipolar electrical pulses.

3. The apparatus of claim 1 wherein the third correlator is a SAW correlator.

4. The apparatus of claim 1 wherein the third correlator is a digital correlator.

5. The apparatus of claim 1 wherein each pulse-shaping circuit comprises an L-C pulse-shaping circuit.

6. The apparatus of claim 1 wherein the first and second SAW correlators each have a chip length that is equal to an integer n.

7. The apparatus of claim 6 wherein the third correlator has a chip length that is equal to an integer m, and the information coded in the SS signal has a code length equal to n×m.

8. The apparatus of claim 7 wherein the code length n×m of the information coded in the SS signal is equal to an integer in a range of 100 to 2000.

9. The apparatus of claim 7 wherein the information coded in the SS signal is coded with a binary phase shift keying (BPSK) code.

\* \* \* \* \*